(No Model.)

F. MOSSBERG.
ROLLER BEARING.

No. 519,868. Patented May 15, 1894.

Witnesses.
Charles Hannigan.
E. B. Read.

Inventor:
Frank Mossberg
by Benj Arnold
Atty.

United States Patent Office.

FRANK MOSSBERG, OF ATTLEBOROUGH, MASSACHUSETTS.

ROLLER-BEARING.

SPECIFICATION forming part of Letters Patent No. 519,868, dated May 15, 1894.

Application filed May 31, 1893. Serial No. 476,101. (No model.)

*To all whom it may concern:*

Be it known that I, FRANK MOSSBERG, of Attleborough, in the county of Bristol and State of Massachusetts, have invented certain new and useful Improvements in Roller-Bearings; and I do hereby declare that the following is a full, clear, and exact description thereof, reference being had to the accompanying drawings, and to the letters of reference marked thereon, which form a part of this specification.

This invention relates to that class of anti-friction bearings using rollers, and is an improvement on the invention disclosed in my United States Letters Patent No. 486,052.

Its object is to provide means for holding the rollers in place in the cages in which they are confined, that will avoid the necessity for cutting a recess in the journal box, as described in said patent, and also to adapt the devices to allow the roller cage to be made in two parts, that the bearing may be applied to shafts in position, without disconnecting them.

It is illustrated in the accompanying drawings.

Figure 1:
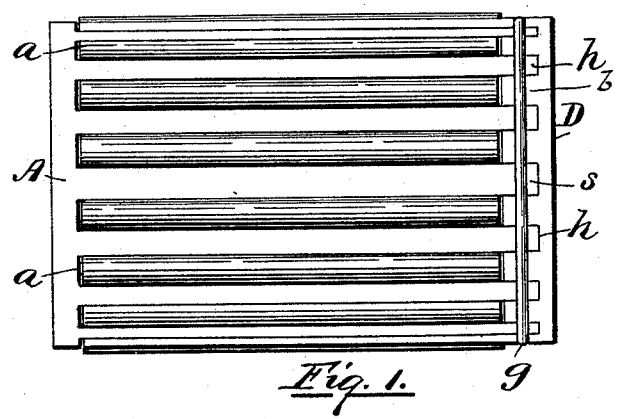
Figure 4:
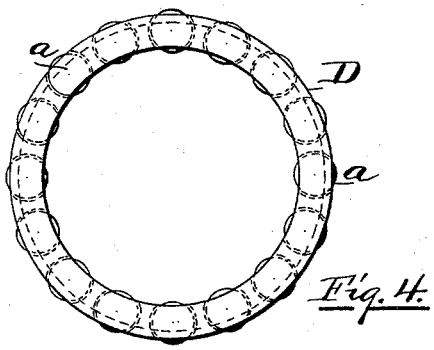
Figure 2:
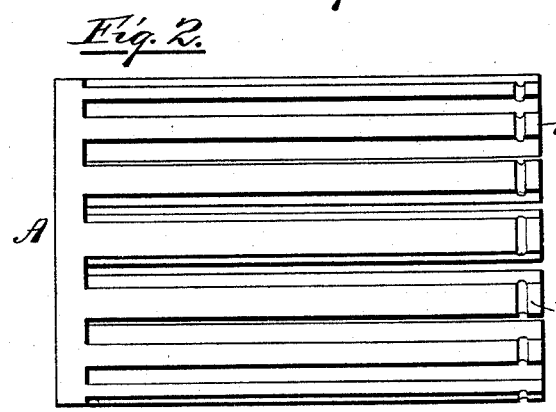
Figures 3, 5:
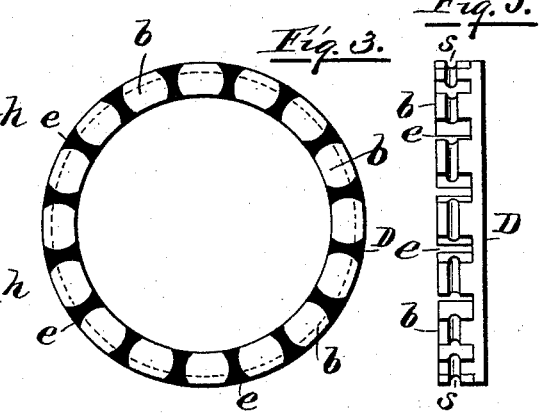
Figure 7:
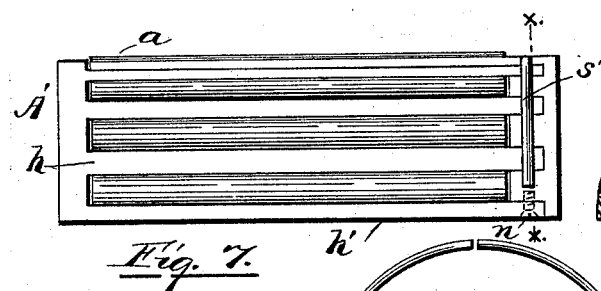
Figures 8, 9:
Figure 6:
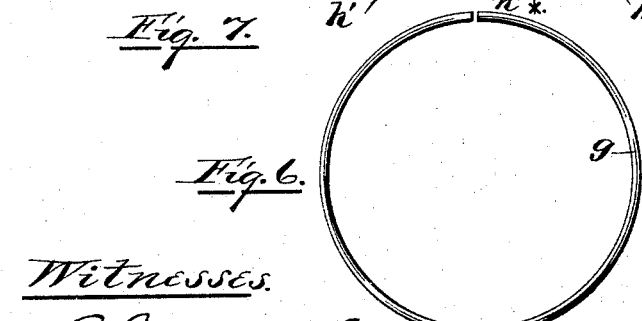
Figure 10:

Figure 1, represents a side elevation of a cage or receptacle with the rollers inclosed therein, separate from the shaft. Fig. 2, is a side elevation of the main portion of the cage, without the rollers and the end cap. Fig. 3, represents the inner face of the end cap that holds the rollers in the cage. Fig. 4, represents a right end elevation of the cage with the rollers complete, as seen in Fig. 1. Fig. 5, represents an edge view of the end cap, separate from the cage. Fig. 6, represents the wire clamp used to hold the end cap in the cage. Fig. 7, is a side elevation of one part of the cage, with rollers inclosed, and an end cap complete when the cage is made in two halves. Fig. 8, represents a vertical cross section of the parts shown in Fig. 7, on the line $x$ $x$, in that figure. Fig. 9, is an edge view of the end cap seen in Fig. 7, separate from the cage and rollers; but having its wire clamp in place. Fig. 10, shows the clamp separate.

The cage for holding the rollers is constructed in a way similar to that described in my patent above mentioned; that is, by taking a tube of metal a little thicker than the diameter of the rollers $a$, intended to be used, and boring a series of holes, slightly larger than the diameter of the rollers, in from one end of the tube nearly to the other end, and then making a ring of metal of the same diameter, inside and outside, as the tube, and counterboring one face of the ring with a counterbore having a hollow center of the same size as the holes drilled in the cage tube, so as to leave a series of projections $b$, that will just fit into the holes drilled in the cage tube, leaving recesses $e$, $e$, between the projections $b$, $b$, that will just receive the ends of portions $h$, left between the holes in the tube. This ring or cap D, is then pressed on to the end of the drilled tube, the projections $b$, $b$, on the cap entering the holes drilled in the tube, and the tube and cap are bored out large enough to remove all the metal on the inside of the tube, out to the inner sides of the holes and a little more, cutting into the holes a little, then placing the tube with the cap on the end of it on an arbor, and turning off in a lathe, the metal outside, until the tube and cap are a little less in thickness than the diameter of the rollers to be used. If the end cap D, is now removed, the cage A, would appear as represented in Fig. 2; but before removing the end cap D, a groove $s$, is turned in the periphery, just far enough from the outside of the cap to cut across both the projections $b$, on the face of the cap, and the bars $h$, of the cage, a little way on from their ends, so that clamping means $g$, of wire, represented in Fig. 6, fitted to spring into this groove and be level with the surface of the bars of the cage A, will hold the cap D, securely to the end of the bars. By springing the clamp $g$, out of the groove, the cap can be removed and the rollers $a$, $a$, put in between the bars $h$, then the cap is again put on, with the projection $b$, entering between the bars $h$, as described, the clamp $g$, is then sprung into the groove $s$, and the bearing is complete for use.

To form the divided bearing A′, shown in Fig. 7, the bearing is taken when the groove $s'$, has been turned in it, as described, and divided lengthwise through two of its bars $h'$, on opposite sides, these bars to be divided, being made a little thicker for that purpose. The wire clamp $g'$, is made in two parts with the shape shown in Fig. 10, with the ends $r$, turned in toward the center, to enter holes $i$, made at the bottom of the grooves in two of the projections $b'$, of the cap, that enter the spaces between the bars $h$, of the cage. Small screws $n, n$, are put through holes in the outer bars $h$, near their ends, and tapped into the same projection $b'$, of the cap, that the ends $r$, of the clamp $g'$, enter. As in the case of the full bearing described, the rollers are placed in between the bars of the half cage $A'$, and the end cap $D'$, put on the end of the bars, the clamp $g'$, is then sprung into place in the groove $s'$, with its ends $r$, in the holes $i$, in the lower projections $b'$, the screws $n$, are screwed in through holes in the bars $h'$, into the same projections, and the half cap is complete for use, as seen in Fig. 7. In case access cannot conveniently be had to the end of the shaft, so that a full bearing like that represented in Fig. 1, can be applied, two of these half bearings, as represented in Fig. 7, can be placed, one on each side of the shaft, and answer all the purposes of the full bearing, as they cannot escape from the journal box, and if the bearing be made whole, as in Fig. 1, or in two parts, the outer surface of the case and cap, will be even, and there will be no ridge to require a recess to be made in the journal box.

Having thus described my improvements, I claim as my invention—

1. In a roller bearing, a cage to hold the rollers, consisting of a series of parallel bars connected together at one end, and forming receptacles between them to receive the rollers, and closed at their other ends, by a cap having projections entering into the spaces between the ends of the bars, said projections and bars having a groove made in the periphery of the combined projections and bars, in combination with said cap and roller, and with clamping means fitted into said groove, substantially as described.

2. A roller bearing consisting of two like halves made of parallel bars connected together at one end, and end rollers between them, and closed at their other ends by semi-circular caps having projections on their inner faces, fitted to enter between the ends of said bars, being held therein by clamping wires lying in grooves made in the outer surface of the projections and bars, and having their ends bent in to enter holes in said projections, with screws passing through the bars into those projections, with said caps and rollers, all said parts combined substantially as described.

3. In a roller bearing, a cage to hold the rollers, consisting of a series of parallel bars connected together at one end, and forming receptacles between them to receive the rollers, and closed at their other ends by a cap having projections, entering into the spaces between the ends of the bars, with said caps and rollers, and means for holding said cap to the bars, all said parts combined substantially as described.

FRANK MOSSBERG.

Witnesses:
BENJ. ARNOLD,
E. B. READ.